United States Patent [19]

Rozell et al.

[11] 4,223,381
[45] Sep. 16, 1980

[54] LOOKAHEAD MEMORY ADDRESS CONTROL SYSTEM

[75] Inventors: James O. Rozell, Richardson; David W. Abmayr, Carrollton, both of Tex.

[73] Assignee: Harris Corporation, Cleveland, Ohio

[21] Appl. No.: 921,075

[22] Filed: Jun. 30, 1978

[51] Int. Cl.² .................... G06F 13/00; G06F 9/06
[52] U.S. Cl. ................................................ 364/200
[58] Field of Search ... 364/200 MS File, 900 MS File; 365/230, 236, 239

[56] References Cited

U.S. PATENT DOCUMENTS

| | | | |
|---|---|---|---|
| 3,292,151 | 12/1966 | Barnes | 364/200 |
| 3,389,380 | 6/1968 | Ashbaugh | 364/200 |
| 3,404,378 | 10/1968 | Threadgold | 364/200 |
| 3,760,369 | 9/1973 | Kemp | 364/200 |
| 4,025,903 | 5/1977 | Kaufman | 364/200 |
| 4,118,773 | 10/1978 | Raguin | 364/200 |

*Primary Examiner*—James D. Thomas
*Attorney, Agent, or Firm*—Craig & Antonelli

[57] ABSTRACT

A selective memory addressing scheme employs a programmable read only memory (PROM) which responds to the opcode of the next instruction to be executed and supplies control information to memory module selection registers. The memory module selection registers operate in conjunction with the internal address registers to provide the necessary steering information for properly addressing the intended memory location. The PROM is programmed in accordance with the instruction set by which the processor operates and is coupled to decode the opcode contents of the instruction register that has been loaded, in a lookahead fashion, with the instruction following the instruction presently being executed by the central processing unit.

The PROM has a first output that defines whether or not a second output of the PROM is to be used to select the memory module containing the operand to be referenced in the execution of the next instruction. This second output of the PROM is of a code size required to identify any one of the modules in the bank. The PROM has a third output that may be used to increment the location counter based upon the length of the next instruction. Where the second output of the PROM is not to be used to select the memory module containing the operand to be referenced, the first output of the PROM has a state such that it gates out information stored in a program status word register to identify the memory module containing the operand of the next instruction to be executed.

To provide for direct CPU intervention in the execution of instructions, such as may occur in the case of an interrupt, prescribed bits of the CPU data bus may be selectively coupled to the module selection circuitry, so that the opcode-dependent operation of the PROM is bypassed and direct CPU selection within the memory bank may be achieved.

19 Claims, 2 Drawing Figures

LOOKAHEAD MEMORY ADDRESS CONTROL SYSTEM

FIELD OF THE INVENTION

The present invention relates in general to electronic data processing systems and, more particularly, to memory addressing and instruction fetching schemes.

BACKGROUND OF THE INVENTION

The development of electronic data processing systems, including microprocessor systems, has resulted in various techniques for storing the instructions that the computer uses in carrying out its intended operations and in fetching the instructions from memory as they are needed during the operation of the data processing system. The systems commonly employ processing implementations whereby the instructions are fetched sequentially from memory one at a time, as they are required for processor operation. Typically, as each instruction is fetched from memory, it is stored in an instruction register, the contents of which are decoded to cause the computer to execute a particular data processing operation, and another register, commonly referred to as a program counter or location counter, has its contents updated, to identify the memory address of the next instruction to be executed by the processor. Then, upon completion of the execution of the present instruction, the next instruction identified by the location counter is fetched from memory and stored in the instruction register, as the cycle is repeated for each respective instruction.

In an effort to reduce processor operating time, lookahead or pre-fetching schemes have been developed, whereby the system begins fetching a new instruction from memory once it has begun executing the present instruction, the contents of the present instruction contained in the instruction register having been decoded, thereby permitting system operation to proceed.

Now, along with the development of processor instruction execution and pre-fetching schemes, improvements in information storage systems have enabled an increasingly greater memory capacity to be utilized by the processor. With the advance of memory packaging schemes, such as improved LSI techniques, very large portions of memory space have been able to be implemented in modular form, so that effectively as much actual memory space as is necessary for any system operation can be provided simply by configuring the memory to contain the appropriate number of memory modules. In other words, information storage is implemented through a bank of memory modules, each of which may be considerable storage capacity in itself, thereby achieving an extremely large system storage capability.

Since each memory module is typically configured identically to every other module in the bank, a selective addressing scheme is required to properly identify the particular module in the bank that contains information to be retrieved, such as instructions or data, or into which information is to be written. The scheme chosen must have the capability of being adaptive, since there may occur situations where an instruction being executed references data that is located in a memory module other than the memory module from which the instruction being executed is obtained. For the purposes of selecting the proper memory module, additional address registers, that may be considered to be extensions of the internal address registers of the system, may be provided for identifying the appropriate memory module that contains the addressed memory location of interest. These registers have conventionally been controlled by softwave via special instructions, which has undesirably resulted in an increase in processor complexity (from both a software and microcode standpoint) and execution time.

SUMMARY OF THE INVENTION

In accordance with the present invention, there is provided a selective memory addressing scheme that employs a programmable read only memory (PROM) which responds to the opcode of the next instruction to be executed and supplies control information to memory module selection registers. The memory module selection registers operate in conjunction with the internal address registers to provide the necessary steering information for properly addressing the intended memory location, without the need for a considerable amount of software. Through this scheme, the present invention enjoys an improvement in memory addressing throughput by reducing the amount of microcode required for an instruction fetch operation. The PROM is programmed in accordance with the instruction set by which the processor operates and is coupled to decode the opcode contents of the instruction register that has been loaded, in a lockahead fashion, with the instruction following the instruction presently being executed by the central processing unit.

The PROM has a first output that defines whether or not a second output of the PROM is to be used to select the memory module containing the operand to be referenced in the execution of the next instruction. This second output of the PROM is of a code size required to identify any one of the modules in the bank. The PROM has a third output that may be used to increment the location counter based upon the length of the next instruction. Where the second output of the PROM is not to be used to select the memory module containing the operand to be referenced, the first output of the PROM has a state such that it gates out information stored in a program status word register to identify the memory module containing the operand of the next instruction to be executed.

To provide for direct CPU intervention in the execution of instructions, such as may occur in the case of an interrupt, prescribed bits of the CPU data bus may be selectively coupled to the module selection circuitry, so that the opcode-dependent operation of the PROM is bypassed and direct CPU selection within the memory bank may be achieved.

Advantageously, the prefetched instruction response scheme provided in accordance with the present invention offers a great deal of flexibility in the memory addressing process, in that instructions can be easily implemented to reference extended memory or the current memory module that is specified by the program status word register. Microcode is saved because similar instructions having differing opcodes can share common microcodes. Also, microcode associated with each instruction to increment the location counter becomes unnecessary since the location counter is incremented by hardware.

DETAILED DESCRIPTION

Figure 1:
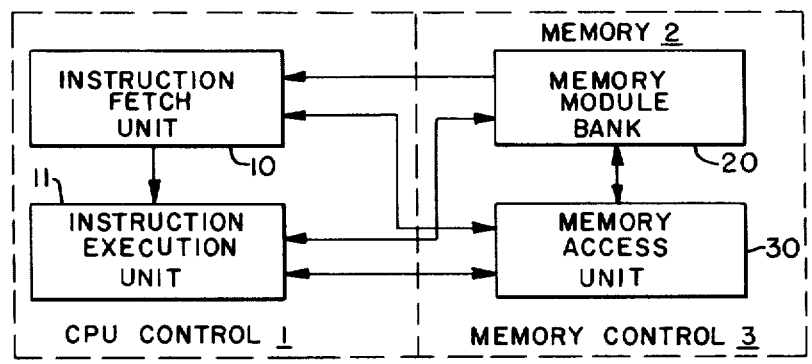
FIG. 1 is a block diagram of a portion of the data communication network between a central processing unit and attendant memory in an electronic data processing system.

Before describing, in detail, the particular improved memory module selection scheme in accordance with the present invention, it should be observed that the present invention resides primarily in a novel structural combination of conventional computer circuits and not in the particular detailed configurations thereof. Accordingly, the structure, control, and arrangement of these conventional computer circuits have been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

Referring now to FIG. 1 of the drawings, there is shown a block diagram of portions of a typical data communication network between a central processing unit and attendant memory in an electronic data processing system, such as a present-day microprocessor system. As was pointed out previously, the present invention is directed particularly to a memory module address selection scheme by which memory addresses are accessed in conjunction with the fetching and execution of instructions by the central processing unit; accordingly, only those portions of the overall data processing system that are pertinent to an understanding of the present invention have been shown in the drawings. To this end, the portion of the system shown in FIG. 1 includes a CPU control section 1, a memory section 2, and a memory control section 3. CPU control section 1 includes an instruction fetch unit 10 and an instruction execution unit 11. Instruction fetch unit 10 responds to CPU control signals and requests each respective instruction in a sequence of instructions, for carrying out a set of processor operations, to be obtained from memory section 2 and supplied to instruction execution unit 11. Thus, instruction fetch unit 10 includes the appropriate instruction register, program or location counter, program status word register circuitry, etc., that respond to CPU control signals and sequentially request and temporarily hold instructions retrieved from storage. Since the present invention is particularly directed to a data processing system with lookahead instruction fetching capabilities, instruction fetch unit 10 is suitably configured to fetch the next instruction in a sequence, once instruction execution unit 11 has begun the necessary execution processing steps for the present instruction.

Communication between the CPU control section 1 and memory section 2 is effected through memory control section 3. Memory control section 3 contains a memory access unit 30 that responds to requests for instructions and/or operands from instruction fetch unit 10 and instruction execution unit 11 and couples data between memory module bank 20 and units 10 and 11. Memory module bank 20 typically contains a plurality of identically configured memory modules, the identity of which has heretofore required considerable software control of the internal address registers contained in memory access unit 30. In eliminating this software control and in further reducing previously required microcode, the present invention resides particularly in a novel implementation of memory access unit 30 and its cooperation with instruction fetch unit 10. In essence, memory access unit 30 contains decoding-control circuitry, to be described in detail below in conjunction with FIG. 2, that selectively vectors CPU control section 1 to the proper memory module within bank 20 in accordance with the opcode of the instruction subsequent to the one being executed by instruction execution unit 11 and fetched by instruction fetch unit 10. In addition, this decoding-control circuitry contained in memory access unit 30 automatically advances the location counter to the address of the next subsequent instruction, thereby further reducing the processing time for both instruction fetch and instruction execution operations of CPU control section 1.

Figure 2:
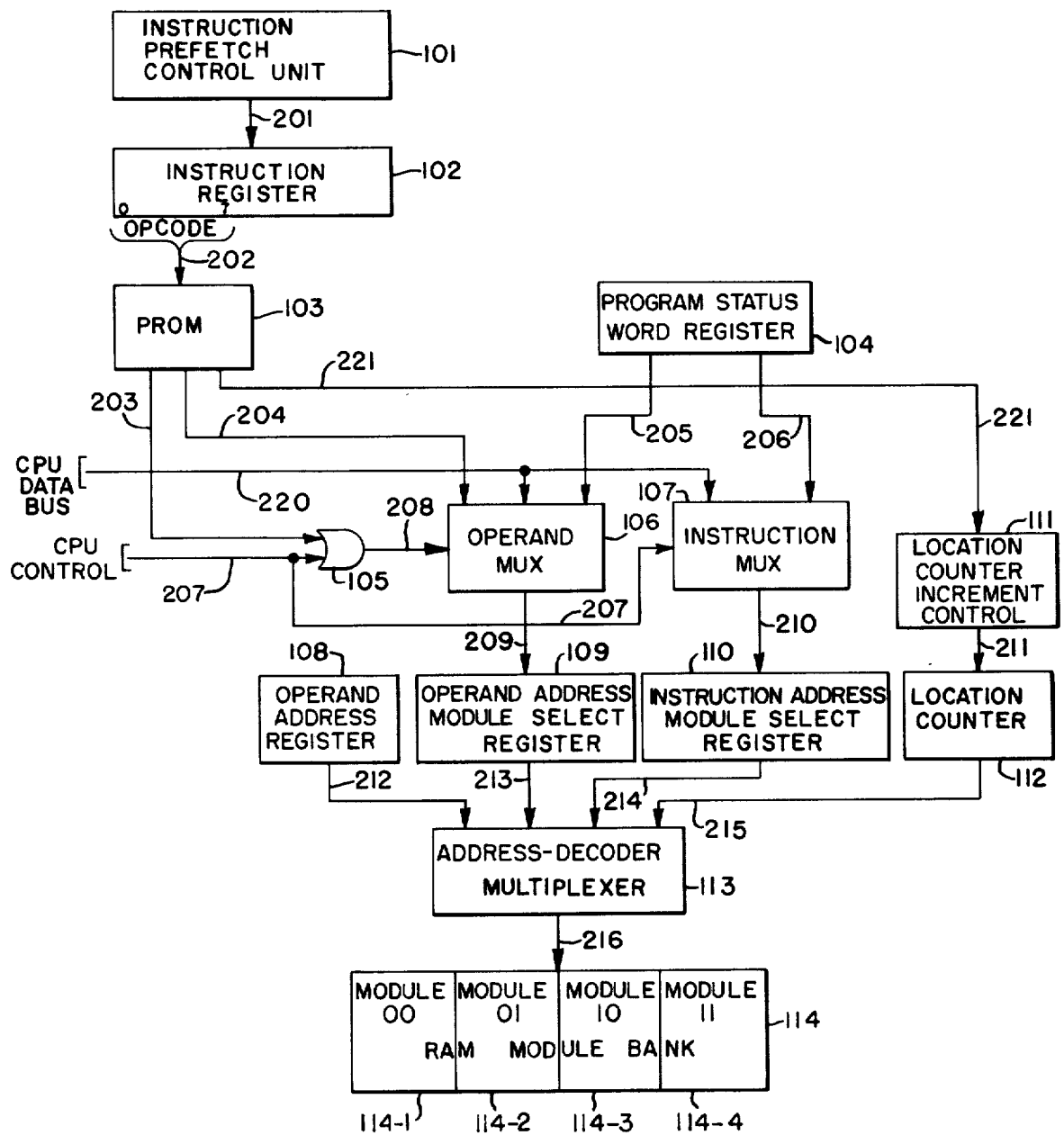
FIG. 2 is a block diagram of a PROM-controlled lookahead memory module selection system.

In detail, looking at FIG. 2, there is shown an instruction prefetch control unit 101 which, as part of the CPU control section, is sequentially caused to fetch an instruction from memory and load the instruction via communication link 201 into an instruction register 102. As is common practice, in normal operation, the memory location of each instruction fetched is defined, in part, by the contents of location counter 112. In accordance with the invention, the particular memory module that contains an operand associated with the instruction identified by the contents of location counter 112 is, selectively addressed in accordance with the opcode of the instruction that has been previously fetched by unit 101 and, in addition, the location counter is automatically incremented by a value corresponding to the length of the instruction, as will be explained in detail below. For purposes of description, at present, it is sufficient to understand that as each instruction is fetched by unit 101, it is loaded in instruction register 102 and, once execution has begun, making further retention of the instruction in register 102 unnecessary, prefetch control unit 101 proceeds, in accordance with the contents of location counter 112, to fetch the next instruction from memory and load it, via link 201, into instruction register 102. Thus, during execution of an instruction, register 102 will contain the instruction immediately following the one presently being executed.

Coupled, via link 202, to that portion of instruction register 102 in which the opcode portion of an instruction is stored is a PROM 103. As is customary practice, the opcode portion of each instruction may consist of eight bits (e.g. bits 0 through 7) of the instruction. Instruction register 102 may have a four byte (32 bit) capacity so as to be capable of storing a full word (32 bits) or a half word (2–8 bit bytes = 16 bits) instruction. PROM 103 may be of any suitable conventional configuration and is programmed to decode the opcode portion of each instruction stored in instruction register 102 in accordance with the instruction set by which the processor operates. PROM 103 has a first output link 203 coupled via OR gate 105 to the control input line 208 of an operand multiplexer (MUX) 106. Depending upon the contents of the opcode portion of register 102, the state of line 203 will be one of two possible binary states. The effect of each state will be explained below.

PROM 103 has a second output coupled to one of the gate inputs of operand multiplexer 106 over link 204. This second output is of a code size sufficient to identity any one of the memory modules contained in module memory bank 114. In the exemplary embodiment described herein, memory module bank 114 contains four memory modules 114-1 . . . 114-4 so that link 204 couples two binary bits to operand multiplexer 106. It should be noted, however, that the number of memory modules of which bank 114 is comprised is not restricted to the four described or to any particular number, but may be increased or reduced as the particular application demands. When adding additional modules, the number of bits that are used to identify the respective memory modules must, of course, be sufficient to accomodate the bank capacity.

A third output of PROM 103 is coupled via line 221 to a location counter increment control circuit 111. Control circuit 111 is, in turn, coupled via link 211, to location counter 112 and, in response to an output signal at the third output of PROM 103, will cause the contents of location counter 112 to be advanced or incremented by either two bytes (where the next instruction is a half-word in length) or four bytes (where the next instruction is a full-word in length). The contents of location counter 112 are supplied over link 215 to memory address decoder/multiplexer 113. Decoder/multiplexer 113 may contain suitable address decoder and multiplexing circuitry that decodes address code inputs supplied over input links 212 through 215 and gates the appropriate address designations to the selected module of bank 114 and the address within the selected module. Thus, anytime a memory location is addressed, that particular memory location will be defined by a module number (00, 01, 10, or 11 for the four module example presented) and a memory address code (2 bytes = 16 bits). The two bits that are employed to designate the selected module may be considered to be two bit extensions of the standard 16 bit memory address code, yielding a total of eighteen bits by which a particular memory location is specified. Thus, when a memory location corresponding to an operand address is to be accessed, the sixteen bit operand address stored in an operand address register 108 and coupled over link 212 to address decoder-multiplexer 113 is combined with a two bit module identity code stored in an operand address module select register 109, the output of which is coupled to decoder/multiplexer 113 over link 213. Similarly, a sixteen bit instruction address and its associated two bit module selection extension are stored respectively in location counter 112 and instruction address module select register 110, the contents of register 110 being coupled to address decoder-multiplexer 113 via link 214.

The memory module selection codes that are stored in registers 109 and 110 are coupled thereto via respective links 209 and 210 from operand multiplexer 106 and instruction multiplexer 107. As was explained previously, operand multiplexer 106 has one input thereof coupled via link 204 to the second output of PROM 103. A second input of operand multiplexer 106 and a first input of instruction multiplexer 107 are coupled to CPU data bus link 220, so that under direct CPU intervention, such as in the case of an interrupt, memory module selection may take place in accordance with directly applied CPU control signals. A third input of operand multiplexer 106 and a second input of instruction multiplexer 107 are supplied, via respective communication links 205 and 206, from program status word register 104. Like links 204 and 220, communication links 205 and 206 supply two bit codes respectively designating the appropriate memory module or modules within module bank 114 for those instructions that require reference to the program status word for the next instruction to be executed. During normal sequencing through a set of instructions, the two bit memory module identification code supplied over link 206 from program status word register 104 will remain the same, so that successive incrementing of the location counter 112 will result in a sequential accessing of the instructions of the set from the proper series of addresses contained in the memory module as originally designated by the two bit code on link 206 from the program status word register 104 at the start of the instruction series. The switching or the gating of the inputs of multiplexers 106 and 107 is controlled over control links 208 and 207, respectively, with OR gate 105 supplying an operand multiplexer control signal from either PROM 103 or CPU control link 207.

As was mentioned briefly above, upon PROM 103 decoding the opcode contained in instruction register 102, the state of line 203 will be one of two binary states. When PROM 103 decodes the opcode to indicate that the next instruction is in sequence, requiring no extra-memory action (as by reference to the program status word register, for example), the binary state of line 203 will be such as to cause operand multiplexer 106 to couple the contents of link 204 as derived from PROM 103 to operand address module select register 109, so that the memory module containing the operand address for the next instruction to be executed will be specified by the second output of PROM 203. Conversely, upon PROM 103 decoding the opcode of the next instruction to indicate that reference to the program status word is required, the binary state of line 203 will be reversed from that just described, thereby causing operand multiplexer 106 to couple the contents of link 205 as supplied by program status word register 104 to operand address module select register 109, so that the memory module containing the operand address for the next instruction will be specified by program status word register 104. For each of the above cases, program status word register continues to designate, via link 206, the memory module within bank 114 for the instructions currently being processed.

OPERATION

Depending upon the demands or privilege factors attributed to a user, a sequence of instructions to be executed may be so defined that any or all of the operands used may be stored in one or a set of memory modules exclusive of the memory module or modules containing instructions. Such an example of restricted user access is set forth simply to illustrate the extended memory reference features of the invention and is not to be considered as restricting the invention only to such a memory use implementation. Again, by extended memory reference is meant a scheme whereby more memory than can be addressed via the normal sixteen bit address code is accessed in accordance with a decoding technique derived on the basis of the opcode portion of an instruction. For purposes of description, it may be assumed that the operands of a set of instructions are located in memory module 114-1 (00) while the instructions are located in memory module 114-4 (11).

Considering now the start of a set of instructions within a program, under CPU control, location counter 112 is initially loaded with the starting address of the program and instruction multiplexer 107 is controlled via link 207 to select the memory module that contains the first instruction in the program as specified by the address loaded in location counter 112. The selected module code may be supplied from program status word register 104 via link 206, or from some other appropriate register in the system, with the memory module selection code being coupled over link 220, for example. Here, it may be assumed that the present program is a branch, and instruction register 102 will have been cleared. Once instruction address module select register 110 and location counter 112 have been loaded with the starting address of the program, memory address decoder/multiplexer 113 accesses the selected memory module and designated instruction address therein, whereby the instruction is read out and loaded, over link 201, into instruction register 102 by instruction prefetch control unit 101. The opcode of the loaded (or next, since the first instruction was, in reality, a branch) instruction is coupled to PROM 103 over link 202 and, in response thereto, PROM 103 supplies appropriate output signals over links 203, 204, and 221 for execution of the instruction and the fetching of the next instruction. Assuming that there is to be no reference to the program status word stored in register 104, the state of lead 203 will be coupled through OR gate 105 over line 208, to cause operand multiplexer 106 to gate the two bit operand address memory module code supplied by link 204 over link 209 to operand address module select register 109. In addition, via link 221, PROM 103 supplies to location counter increment control circuit 111 a signal indicative of the length of the instruction to be executed, so that, via line 211, control circuit 111 causes location counter 112 to be incremented or advanced by either two or four bytes. As the CPU proceeds to execute the present instruction, operand address register 108 is loaded with the intramodule address of the operand for the instruction and this intramodule operand address is then coupled over link 212 to memory address decoder multiplexer 113 so that it may address the corresponding memory location in the selected memory module, such as module (00) selected in accordance with the contents of operand address module select register 109, supplied over link 213. During execution of the instruction, with location counter 112 having been advanced to the memory location within the memory module previously selected in accordance with the code supplied over link 206 from program status word register 104, instruction prefetch control unit 101 proceeds to load this next instruction over link 201 into register 102, so that its opcode may be examined by PROM 103 just as was the case with the previously fetched or presently being executed instruction.

The foregoing set of operations may continue for each successive instruction. However, should the opcode of the instruction examined by PROM 103 indicate a reference to the program status word for the location of the next operand, the contents of register 109 may be modified. In this case, the state of line 203 is such as to cause operand multiplexer 106 to gate the two bit memory module selection code from the program status word register 104 supplied over link 205, to link 209 and into operand address module select register 109, so that the memory module in bank 214 designated by register 109 may be changed to another module.

Direct CPU intervention, such as for an interrupt condition, that takes precedence over the executions of the program presently being serviced, is provided by appropriate instruction and operand control signals supplied via the CPU data bus link 220 to instruction multiplexer 107 and operand multiplexer 106, respectively. Switching of the inputs of the multiplexers is effected by a switching control signal over CPU control link 207. Location counter 112 is also appropriately loaded with the address of the first instruction of the interrupting program so that its instructions may be executed in a manner corresponding to that just described.

In the foregoing examples of operation of the memory accessing scheme in accordance with the present invention, it was assumed that execution of an instruction required access to an operand-associated memory module. In those instructions where reference to an operand stored in one of the memory modules is not required for execution of the instruction (as in the case of an instruction that actually contains the operand) no action is taken by the CPU relative to the contents of registers 108 and 109, and PROM 103 may be appropriately programmed to always designate the same memory module in such cases.

In accordance with the present invention, for each sequence of instructions to be executed, because of the memory module selection scheme and the PROM-controlled updating of the location counter to assist in the lookahead technique employed, reference to extended memory is facilitated by reducing the amount of software and microcode that would be otherwise required for controlling the address registers through which memory access is effected. This, in turn, leads to a considerable savings in processor operation time, and an improvement in data throughput.

While we have shown and described an embodiment in accordance with the present invention, it is to be understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a data processing system having a central processing unit, a memory module bank containing a plurality of memory modules, an instruction storage buffer in which instructions retrieved from said memory module bank are stored, and a memory access unit, coupled to said central processing unit and said instruction storage buffer, for controlling the addressing of locations in said memory module bank relative to which instructions and operands associated with said instructions are accessed, the improvement wherein said memory access unit comprises:

first means, coupled to said instruction storage buffer, for generating a first memory identification code representative of a selected one of said memory modules in accordance with the contents of the opcode portion of an instruction stored in said instruction storage buffer; and second means, coupled to said first means, for generating a second memory identification code representative of the address location in the memory module from which the next instruction to be executed may be obtained in accordance with said opcode portion of the instruction stored in said instruction storage buffer.

2. The improvement according to claim 1, wherein said first memory identification code is representative of the memory module containing the operand associated with an instruction to be executed.

3. The improvement according to claim 1, wherein said first memory identification code is representative of the memory module containing the operand associated with said next instruction to be executed.

4. The improvement according to claim 1, wherein said system includes a location counter, the contents of which identify the address within that one of said memory modules from which the next instruction to be executed may be fetched.

5. The improvement according to claim 4, wherein said second means includes means for causing said location counter to be incremented by an amount representative of said second memory identification code and corresponding to the length of the instruction stored in said instruction storage buffer.

6. The improvement according to claim 4, wherein said memory access unit further comprises third means, coupled to said central processing unit, for storing a third memory identification code supplied by said central processing unit representative of that one of said memory modules from which the next instruction to be executed may be fetched, and causing said that one of said memory modules to be addressed in accordance with the contents of said location counter.

7. The improvement according to claim 2, wherein said memory access unit further comprises third means, coupled to said first means, for selectively storing said first memory identification code and causing said selected one of said memory modules to be addressed in accordance with the operand address associated with said instruction to be executed.

8. The improvement according to claim 7, wherein said third means includes means selectively coupled to receive from said central processing unit a third memory identification code representative of a prescribed one of said memory modules, and wherein said first means includes means for causing a selected one of said first and third memory identification codes to be stored by said third means in accordance with said contents of a selected portion of an instruction stored in said instruction storage buffer.

9. The improvement according to claim 8, wherein said third means is coupled to a program status word register form which said third memory identification code is selectively supplied thereto.

10. The improvement according to claim 8, wherein said system includes a location counter, the contents of which identify the address within that one of said memory modules from which the next instruction to be executed may be fetched.

11. The improvement according to claim 10, wherein said second means includes means for causing said location counter to be incremented by an amount representative of said second memory identification code and corresponding to the length of the instruction stored in said instruction storage buffer.

12. The improvement according to claim 10, wherein said memory access unit further comprises fourth means, coupled to said central processing unit, for storing a fourth memory identification code supplied by said central processing unit representative of that one of said memory modules from which the next instruction to be executed may be fetched, and causing said that one of said memory modules to be addressed in accordance with the contents of said location counter.

13. The improvement according to claim 12, further including fifth means, coupled to said third means and said fourth means, for supplying thereto respective fifth and sixth memory identification codes supplied by said central processing representative of respective memory modules to be addressed independent of said contents of a selected portion of an instruction stored in said instruction buffer.

14. The improvement according to claim 13, wherein said third means is coupled to a program status word register from which said third memory identification code is selectively supplied thereto.

15. The improvement according to claim 12, wherein said fourth means is coupled to a program status word register from which said fourth memory identification code is supplied as representative of that one of said memory modules from which the next instruction to be executed may be fetched.

16. In a data processing system having a central processing unit, a memory module bank containing a plurality of memory modules, an instruction storage buffer in which instructions retrieved from said memory module bank ae stored, and a memory access unit, coupled to said central processing unit and said instruction storage buffer, for controlling the addressing of locations in said memory module bank relative to which instructions and operands associated with said instructions are accessed, the improvement wherein said memory access unit comprises:

means, responsive to the opcode portion of an instruction to be executed, stored in said instruction storage buffer, for generating a first memory identification code, representative of the memory module containing the operand of the next instruction to be executed, and a second memory identification code representative of the address location in the memory module from which the next instruction to be executed is to be fetched.

17. The improvement according to claim 16, wherein said system includes an operand address register for storing an operand address code representative of the address location in an operand-containing memory module in which the operand of the next instruction to be executed is stored, and further including means for combining said first memory identification code with said operand address code and thereby accessing the operand of the next instruction to be executed.

18. The improvement according to claim 17, wherein said system includes a location counter, the contents of which identify the address within that one of said memory modules from which the next instruction to be executed may be fetched, and wherein said system further includes means for causing said location counter to be incremented by an amount representative of said second memory identification code and corresponding to the length of the instruction stored in said instruction storage buffer.

19. The improvement according to claim 18, wherein said system includes means for storing the module address of that one of said memory modules in said bank in which the next instruction to be executed is stored and means for combining the contents of said location counter with said module address and thereby accessing the next instruction to be executed.

* * * * *